(12) United States Patent
Menon

(10) Patent No.: US 12,480,868 B2
(45) Date of Patent: Nov. 25, 2025

(54) OPTICAL DEVICE

(71) Applicant: ITPHOTONICS S.R.L., Breganze (IT)

(72) Inventor: Alessandro Menon, Ponte San Niccolo' (IT)

(73) Assignee: ITPHOTONICS S.R.L., Breganze (IT)

( * ) Notice: Subject to any disclaimer, the term of this patent is extended or adjusted under 35 U.S.C. 154(b) by 203 days.

(21) Appl. No.: 18/283,804

(22) PCT Filed: Mar. 25, 2022

(86) PCT No.: PCT/IB2022/052758
§ 371 (c)(1),
(2) Date: Sep. 24, 2023

(87) PCT Pub. No.: WO2022/201117
PCT Pub. Date: Sep. 29, 2022

(65) Prior Publication Data
US 2024/0167942 A1    May 23, 2024

(30) Foreign Application Priority Data
Mar. 25, 2021 (IT) .......................... 102021000007322

(51) Int. Cl.
*G01N 21/31* (2006.01)
(52) U.S. Cl.
CPC .................................... *G01N 21/31* (2013.01)
(58) Field of Classification Search
CPC ........... G01N 2021/555; G01N 21/274; G01N 21/31; G01N 21/359; G01N 21/474; G01N 21/55; G01N 21/85; G01N 2201/0634; G01N 2201/065
See application file for complete search history.

(56) References Cited

U.S. PATENT DOCUMENTS

| | | | |
|---|---|---|---|
| 4,806,764 A | 2/1989 | Satake | |
| 4,900,923 A | 2/1990 | Gerlinger | |
| 8,830,473 B2 | 9/2014 | Margraf | |
| 2008/0204705 A1 | 8/2008 | Liu | |
| 2011/0235035 A1* | 9/2011 | Iguchi | G01N 21/645 356/326 |
| 2018/0364160 A1 | 12/2018 | Aben | |
| 2020/0271511 A1* | 8/2020 | Suzuki | G01J 3/0202 |

* cited by examiner

*Primary Examiner* — Hina F Ayub
(74) *Attorney, Agent, or Firm* — Carmel Patent Agency; Robert Ballarini

(57) ABSTRACT

An optical device includes an emitting apparatus and an optical guide. The emitting apparatus includes a first aperture for emitting an excitation radiation therethrough, the excitation radiation includes at least one light radiation having a wavelength included in a predefined spectral range. The optical guide extends longitudinally between first and second ends thereof and is internally provided with a core which is suitable for propagating radiation with a wavelength included in the predefined spectral range and defining an inlet aperture at the first end and an outlet aperture at the second end, the inlet aperture facing the first aperture so as to be passed through by at least a portion of the excitation radiation when it is emitted by the emitting apparatus and the outlet aperture is directed towards an unknown sample when the optical device is in a first operating condition.

21 Claims, 3 Drawing Sheets

OPTICAL DEVICE

TECHNICAL FIELD

The present invention relates to an optical device, in particular an optical device for illuminating an unknown sample, more particularly an optical device for measuring the reflection characteristics of an unknown sample.

TECHNOLOGICAL BACKGROUND

The invention applies in particular, though non-exclusively, to the technical field relevant to the analysis of chemical-physical parameters of a sample of material, such as a food product, by measuring an optical radiation spectrum obtained from the reflection of a light radiation incident on the sample.

Specifically, the invention applies to the spectrometric analysis of a product making it possible to determine quantity and quality of the physical and chemical characteristics thereof. Examples of reflected radiation measuring devices are disclosed in U.S. Pat. Nos. 5,956,133A and 10,126,244B2. Additional examples of known optical systems are disclosed in U.S. Pat. No. 8,830,473 B2, US 2018/364160 A1, US 2008/204705 A1, U.S. Pat. Nos. 4,900,923 A, and 4,806,764 A.

It is noted, however, that the known apparatuses of the aforementioned type may suffer from some limitations.

In fact, spectrophotometers commonly used to perform spectrometric analysis generate a non-zero output signal in the absence of an excitation radiation, known as a dark current that needs to be characterized. It is a common practice to determine the absolute reflectance value of an unknown sample based on a relative reflectance measurement with respect to the radiation reflected by a reference sample positioned in place of an unknown sample. Given the absolute reflectance of the reference sample, it is possible to calculate the absolute reflectance of the unknown sample.

However, in process instruments, the reference sample cannot always be positioned in the same place as the unknown sample and therefore it is typically positioned upstream of the unknown sample with respect to the direction of the incident light radiation.

Therefore, the spectral, angular, and energy density distribution of the radiation incident on the reference and unknown sample may be different, particularly as a function of a reference position such as, for example, the centre of both samples. This aspect becomes even more critical when the measurement area of the instrument is particularly large compared to the illuminated area.

It is therefore complicated to correctly determine the absolute reflectance of the unknown sample.

SUMMARY OF THE INVENTION

The object of the present invention is to make available an optical device that is structurally and functionally designed to overcome at least one limitation of the above-mentioned known technique. This object is achieved by an optical device made according to the independent claim enclosed to the present description.

Preferred features of the invention are defined in the dependent claims.

According to a first aspect of the invention, the optical device comprises an emitting apparatus provided with a first aperture and suitable to emit an excitation radiation through such first aperture. The excitation radiation comprises at least one light radiation having a wavelength included in a predefined spectral range. Preferably, the predefined spectral range is defined between 200 nm and 2500 nm, more preferably between 900 nm and 1700 nm.

According to an embodiment of the invention, the first aperture corresponds to an opening of the emitting apparatus or to an optical window of the emitting apparatus that is transparent to the excitation radiation and preferably plane.

Preferably, the first aperture defines a first plane surface of the emitting apparatus.

The optical device also comprises an optical guide that extends longitudinally between a first end thereof and a second end thereof.

In particular, the optical guide extends longitudinally along a direction that defines the optical axis of the optical guide.

The optical guide is internally provided with a core suitable for propagating radiation with a wavelength included in the aforesaid predefined spectral range and defining an inlet aperture at the first end and an outlet aperture at the second end.

Preferably, the inlet aperture and/or the outlet aperture delimit a relative optical window that is transparent to the excitation radiation emitted by the emitting apparatus.

According to an aspect of the invention, the inlet aperture is facing the first aperture so as to be passed through by at least a portion of the excitation radiation when this is emitted by the emitting apparatus.

In particular, the inlet aperture is arranged at or, in any case, near the first aperture so as to be passed through by at least the majority of the excitation radiation emitted by the emitting apparatus.

According to an aspect of the invention, the outlet aperture is intended to face an unknown sample when the optical device is in a first operating condition. In the context of the present invention, the unknown sample is represented by a material intended to be illuminated by the excitation radiation, preferably in order to measure its electromagnetic reflectance and/or transmittance characteristics, particularly in a predefined spectral band, and possibly for qualitatively and/or quantitatively extrapolating the chemical-physical characteristics of the unknown sample.

For exemplary purposes, the material may be an organic material, such as a food product.

The material may be a mixture of organic substances.

According to an embodiment of the invention, the optical guide comprises a reflective surface that at least partially delimits the core. Preferably, the reflective surface completely delimits the core. In particular, the reflective surface is an optical surface that is regular (at least) with respect to radiation with a wavelength included in the aforesaid predefined spectral range.

In the context of the present invention, the regular optical surface is a smooth surface, or at least predominantly smooth, or has roughness and/or irregularities characterized by small, or at least predominantly small, size with respect to the wavelength of the radiation incident on such surface. Preferably, the arithmetic average roughness Ra of the reflective surface is smaller than the shortest wavelength of the rays belonging to the predefined spectral range.

Preferably, the arithmetic average roughness Ra of the reflective surface is equal to or lower than 0.2 um.

Preferably, the reflective surface has a glossiness equal to or greater than 80 GU (Gloss Unit).

According to an embodiment of the invention, the reflective surface is a surface polished and/or treated in such a way as to be substantially assimilated to a mirror, i.e. capable of deviating most of the incident rays according to the law of reflection, at least along each plane parallel to the optical axis of the optical guide, in particular both along each plane parallel to the optical axis of the optical guide and along any plane orthogonal to such optical axis and tangent to the reflective surface.

According to an aspect of the invention, the reflective surface is adapted to reflect, preferably in a substantially mirror-like manner, the portion of the excitation radiation projected into the core of the optical guide through the inlet aperture such to propagate the excitation radiation out of the optical guide through the outlet aperture in order to illuminate the unknown sample.

Therefore, in the context of the present invention, the optical device may be considered in the first operating condition when the emitting apparatus emits an excitation radiation and it illuminates an unknown sample by means of the optical guide.

According to an aspect of the invention, the optical device includes a gap arranged between the first aperture and the inlet aperture.

The gap is adapted to receive a reference sample such that such excitation radiation emitted by the emitting apparatus through the first aperture illuminates the reference sample when the optical device is in a second operating condition in which the reference sample is received in the gap.

In other words, the excitation radiation emitted by the emitting apparatus through the first aperture is intercepted and reflected by the reference sample (i.e. hits the reference sample) when the optical device is in the second operating condition.

In the context of the present invention, the reference sample may be identified in a material whose reflection characteristics and/or optical properties are known.

In particular, the reference sample is chosen so that it can maintain its reflectivity and/or optical and/or chemical and/or physical properties substantially unchanged over time.

In the context of the present invention, the optical device may therefore be considered in a second operating condition when the emitting apparatus emits an excitation radiation and this excitation radiation illuminates the reference sample received in the gap. It must be noted that the presence of the optical guide and the gap allows to illuminate the unknown sample and the reference sample by the excitation radiation when the optical device is in the first operating condition and, respectively, in the second operating condition, minimizing the difference between the spectral and intensity distribution of the energy on average incident on the unknown sample and that of the energy incident on the reference sample.

In particular, the arrangement of the emitting apparatus, the optical guide and the gap, arranged between the first aperture of the emitting apparatus and the inlet aperture of the optical guide, ensures to hit the reference sample with a light radiation having spectral distribution, energy density and angular distribution thereof, substantially similar to that of the light radiation incident on the unknown sample.

This expedient ensures that the amplitudes of the signal collected by an optical receiver, detailed hereinafter, are comparable under both operating conditions of the optical device, if the unknown sample had, for example, a reflectance comparable to that of the reference sample; this would therefore also ensure a maximization of the signal to noise ratio in calculating the reflectance of the unknown sample.

If, in fact, the light signal on the reference sample was remarkably lower than the signal incident on the unknown sample, it would be necessary to reduce the integration time of the optical receiver in order to avoid signal saturation when the optical device is in the second operating condition. From this it would result that the signal amplitude in the first operating condition would be greatly reduced, implying an increase in the measurement noise in calculating reflectance, since such signal is used in the denominator of the ratio.

As will be better explained hereinafter, this effect obtained by the optical device according to the invention, i.e., a substantial correspondence of the spectral distribution, energy density and angular distribution thereof between the light radiation incident on the reference sample and that incident on the unknown sample, proves particularly useful in order to absolutize the value of a reflectance measurement of an unknown sample using the known reflectance of a reference sample, while maximizing the SNR ratio in the reflectance calculation.

In fact, an accurate calculation of the absolute reflectance value of the unknown sample normally requires the angular energy distribution, while measuring the reference sample and the unknown sample, to be as similar as possible.

It is the Applicant's opinion to point out that these effects and advantages are not obtained by the device disclosed in U.S. Pat. No. 8,830,473 B2 because the reference element described therein, in order to allow handling and avoid mechanical interference, is spaced apart from the integrating sphere, therefore the energy angular distribution on the reference element differs significantly (in particular there is a rapid decay of energy and reduction of the distribution angle) from that on the unknown sample.

This configuration of the U.S. Pat. No. 8,830,473 B2 device actually precludes the possibility of directly coupling the receiver and the spectrometer, as the latter would have to be rotated together with the illuminated element to change the operating condition, actually representing an integration limitation for most industrial applications.

The Applicant also believes that at least the solution disclosed in US 2018/364160 A1 suffers from the same problem. Indeed, the prior art US 2018/364160 A1 discloses an illuminating integrating sphere suitable for illuminating an unknown element located at a position moved away from the integrating sphere with respect to a reference element without any light guide being present. The moving away from the opening of the integrating sphere produces a rapid decay of energy and therefore the reference element is in an illuminating condition that is very different from that of the unknown element.

It must also be noted that the introduction of the reference sample into the gap of the optical device according to the invention allows to use reference sample handling systems characterized by small power and footprint, low mass and therefore inertia that allow to use the optical device in various applications as will be better explained hereinafter. The excitation radiation emitted by the outlet aperture and reflected by the unknown sample can be read by a spectrophotometer to measure the reflection characteristics of the unknown sample.

This allows to determine the relative reflectance Rr of the unknown sample (generally Rr is a vector of values, wherein each component of the vector represents an intensity of the light radiation collected by the spectrophotometer in a specific wavelength range) using the following formula:

$$Rr=(M-D)/(W-D)$$

where M represents the intensity values of the light radiation reflected by the unknown sample and acquired by the spectrophotometer, D represents the current or dark signal of the spectrophotometer and W represents the intensity values of the light radiation reflected by the reference sample and acquired by the spectrophotometer.

The dark signal of the spectrophotometer may be determined by collecting the values acquired by the spectrophotometer after the introduction of the reference sample into the gap of the optical device and by keeping the emitting apparatus switched off (no excitation radiation emitted or input from outside).

Such configuration may be considered as a third operating condition of the optical device.

The absolute reflectance value Ra of the unknown sample will therefore be theoretically calculated as the external product of the vectors:

$$Ra = Rr * Rw$$

where Rw is the vector containing the known values (e.g. tabular values) of absolute reflectance of the reference sample.

Therefore, the characteristics of the optical device according to the invention prove to be particularly advantageous in order to allow a correct determination of the absolute reflectance value of the unknown sample even if it is arranged at a different distance from the emitting apparatus than the reference sample.

In addition, the optical device according to the invention allows to eliminate or at least reduce the need to resort to algorithms for correcting the measured absolute reflectance value of the unknown sample, to the benefit of a computational and architectural simplification of the optical device. According to an embodiment of the invention, the core is suitable for propagating a first light signal introduced into the core through the outlet aperture so as to transmit the first light signal towards the first aperture through the inlet aperture, the first light signal corresponding to at least a portion of the excitation radiation emitted by the outlet aperture and reflected (specular and/or diffuse reflection) by the unknown sample when the optical device is in the first operating condition.

This provision allows the spectrometer to be placed upstream of the optical guide to measure the reflection characteristics of the unknown sample.

According to an embodiment of the invention, the excitation radiation emitted by the emitting apparatus is a light which is diffused in a substantially homogeneous manner at the first aperture.

Preferably, the emitting apparatus is a diffuse light source.

Specifically, diffuse light is a light radiation whose rays reach the first aperture and, therefore, the reference sample when present or the unknown sample through the optical guide, with a dispersion of angular intensity as homogeneous as possible over the entire plane angle.

This allows to maximize the probability of interaction of the incident radiation with the unknown sample or reference sample while limiting the probability of specific interactions related to a certain incident angle.

According to an embodiment of the invention, the emitting apparatus includes a cavity delimited by an internal surface.

The emitting apparatus further comprises a light source suitable for projecting a first light radiation onto the internal surface which is suitable for reflecting, in particular in a diffuse manner, the first light radiation thus giving rise to the excitation radiation.

According to an embodiment of the invention, the internal surface is at least partially spherical, preferably entirely spherical, such that the excitation radiation is of a substantially diffuse type at the first aperture of the emitting apparatus. This allows to minimise any difference between the actual angular energy distribution of the excitation radiation and the theoretical definition of diffuse light.

Preferably, the emitting apparatus comprises an integrating sphere comprising an interior empty space corresponding to the cavity delimited by the aforesaid internal surface.

Preferably, the internal surface delimiting the aforesaid cavity is superficially treated so as to diffuse in a random and multiple manner the direction of the incident rays coming from the light source.

Preferably, such a surface is such that the intensity of such incident rays is reduced by a moderate amount.

Preferably, the internal surface has a reflection coefficient as close to the unit value as possible, and an irregular surface morphology that makes it substantially Lambertian, i.e., capable of diffusing the first radiation in a substantially homogeneous manner according to all directions.

Consequently, the emitting apparatus corresponds to a diffuse light source.

According to an embodiment of the invention, the optical device comprises an optical barrier, also known as a "baffle", which is opaque to the first light radiation.

The optical barrier is arranged in the cavity of the emitting apparatus between the light source and the first aperture in such a way as to intercept the first light radiation, preventing it from directly reaching, i.e. without (diffusive) reflection, the first aperture.

Such an aspect allows to reduce the perturbation of the angular distribution and density of the excitation radiation entering the optical guide and incident on the reference sample (when this is received in the gap of the optical device), as well as its exiting spatial distribution.

According to an embodiment of the invention, the core of the optical guide has a circular cross-section which is preferably constant along the entire longitudinal extent of the optical guide.

This avoids the production of concentration effects as the size of the illuminated area of the unknown sample is comparable to that of the reference sample. Preferably, the size and/or shape of the inlet aperture is the same as that of the outlet aperture.

According to an embodiment of the invention, the reflective surface is cylindrical.

According to an embodiment of the invention, the inlet aperture delimits a plane inlet surface of the optical guide.

Preferably, the plane inlet surface is parallel to the first plane surface of the emitting apparatus.

According to an embodiment of the invention, the outlet aperture delimits a plane outlet surface of the optical guide.

Preferably, the plane inlet surface is parallel to the plane outlet surface of the optical guide.

This promotes a uniform distribution of energy density.

According to an embodiment of the invention, the optical guide is arranged such that the plane outlet surface is parallel to a medium plane surface that best approximates the surface of the unknown sample, at the projection of the outlet aperture, when the optical device is in the first operating condition. This feature allows to maximize the energy incident on the unknown sample, thus increasing the efficiency of the optical device and the reliability of the measurement by a spectrometer because the radiation incident on the unknown sample is more similar to the radiation incident on the reference sample the closer the unknown sample is to the outlet surface of the optical guide.

According to an embodiment of the invention, the reflective surface of the optical guide is suitable for reflecting a light radiation, incident on such reflective surface, having a wavelength between 200 nm and 2500 nm, preferably between 900 nm and 1700 nm. The reflective surface may be made of gold.

According to an embodiment of the invention, the core is a cavity comprising at least one substance in a non-diffuse gaseous state which is substantially transparent to radiation with a wavelength included in the aforementioned predefined spectral range.

Preferably, in such a case, the reflective surface is made of gold.

For exemplary purposes, the substance in the gaseous state may be (dry) air, argon or nitrogen. Nitrogen, for example, would make it possible to limit oxidation of the reflective surface over time.

According to an alternative embodiment of the invention, the core is a solid body which is constructed from non-diffusive material which is substantially transparent to radiation with a wavelength included in the predefined spectral range. For exemplary purposes, the core of the optical guide may be made from the central core of an optical fibre, the optical fibre comprising a cladding surrounding the central core.

In this case, the reflective surface of the optical guide corresponds to the interface between the central core and the cladding of the optical fibre due to the refractive index jump between the aforesaid central core and the relative cladding.

In this case, the inlet aperture and the outlet aperture of the optical guide coincide with the respective transversal solid surfaces, preferably suitably treated by lapping, of the core trunk of the optical fibre.

It may be provided that the optical fibre is of the multi-core type.

In this case, the set of central cores of the multi-core optical fibre forms the core of the optical guide while the set of interfaces between the central cores and the respective claddings of the multi-core optical fibres forms the reflective surface of the optical guide.

In this case, the inlet aperture and the outlet aperture of the optical guide coincide with the set of respective transverse solid surfaces, preferably suitably treated by lapping, of the trunk of the optical fibre cores.

The (single-core or multi-core) optical fibre may be single-mode or multi-mode.

According to an embodiment of the invention, the optical device comprises an optical component arranged within the optical guide, i.e., arranged between the inlet aperture and the outlet aperture of the optical guide.

The optical component extends into the core and is apt to change the angle of view framed, particularly by the optical receiver, through the outlet aperture.

This feature allows to change the original field framed by the optical device (i.e., the field framed by the optical device without the optical component described above) when it is in its first operating condition, thus adapting the field framed through the outlet aperture to the size of the unknown sample. Preferably, the optical component has an optical axis coincident with the optical axis of the optical guide.

Preferably, the optical component is with positive equivalent focal length to reduce the angle of view framed through the outlet aperture. Preferably, the optical component is with negative equivalent focal length to enlarge the angle of view framed through the outlet aperture.

The optical component is preferably transparent to the excitation radiation.

According to an embodiment of the invention, the optical component consists of a single lens. Alternatively, the optical component comprises a lens assembly.

The optical component is preferably removably coupled to the optical guide.

According to an embodiment of the invention, the optical device comprises an optical receiver arranged to receive and collect the first light signal or a second light signal passing through the first aperture (at least a portion thereof), wherein the second light signal corresponds to at least a portion of the light radiation reflected (specular and/or diffuse reflection) by the reference sample when it is in the second operating condition.

In particular, the optical receiver is external to the optical guide.

According to an embodiment of the invention, the emitting apparatus comprises a cavity provided with the first aperture and the optical receiver is contained within such cavity so as to receive the first light signal or the second light signal projected into the cavity of the emitting apparatus through the first aperture.

Preferably, the aforesaid cavity corresponds to the one delimited by the internal surface of the emitting apparatus.

In particular, the cavity of the emitting apparatus corresponds to the empty space delimited by the internal surface of the integrating sphere.

According to an alternative embodiment of the invention, the emitting apparatus may comprise a cavity provided with the first aperture and a second aperture arranged to be passed through by at least a portion of the first light signal or the second light signal projected into the cavity of the emitting apparatus through the inlet aperture.

Preferably, the second aperture is arranged as opposite the inlet aperture with respect to the centre of the cavity of the emitting apparatus.

In this case, the optical receiver is arranged at the second aperture, outside or at least partially inside the emitting apparatus, so as to receive at least a portion of the first light signal, or the second light signal, which therefore passes through both the first and the second aperture.

Also in this alternative embodiment of the invention, the cavity of the emitting apparatus preferably corresponds to that delimited by the internal surface of the emitting apparatus.

Preferably, said cavity corresponds to the empty space delimited by the internal surface of the integrating sphere, which is provided with both the first aperture and the second aperture.

According to an embodiment of the invention, the optical receiver is arranged as opposite the inlet aperture with respect to the centre of the cavity of the emitting apparatus.

Preferably, the optical receiver is arranged in such a way as to detect at least a portion of the rays of the first light signal or the second light signal propagating in the cavity of the emitting apparatus within a defined solid angle or field of view (FOV) which extends around an axis having a specific direction with respect to the normal to the first plane surface of the emitting apparatus.

In a preferred embodiment of the invention, said axis around which the field of view (FOV) develops is perpendicular to the first plane surface of the emitting apparatus.

According to an embodiment of the invention, the optical receiver comprises a focusing lens and, preferably, an optical fibre. The focusing lens is suitable for reproducing, through the rays of the first or second light signal received, the image of the unknown sample or, respectively, of the reference sample on an optical inlet plane of the optical fibre. The optical fibre is suitable for carrying that optical signal to a photoelectric sensor or spectrophotometer.

According to an embodiment of the invention, the optical device comprises a spectrophotometer operatively connected to the optical receiver to receive a light radiation (optical signal) sent by the optical receiver based on the first or second light signal received.

Preferably, the light radiation sent by the optical receiver corresponds to at least a portion of the first or second light signal captured by the optical receiver, in particular it corresponds to the rays of the first light signal or the second light signal detected by the optical receiver.

According to an embodiment of the invention, the spectrophotometer is a NIR spectrophotometer capable of analysing the intensity of the near-infrared radiation.

According to an embodiment of the invention, the spectrophotometer comprises an inlet slit, preferably a return mirror, a reflective and focusing holographic diffraction grating, at least one photo-receiver (preferably an array of photo-receivers) sensitive to the wavelengths of interest (preferably wavelengths included in the predefined spectral range), and electronics for amplifying, controlling and acquiring the light radiation (optical signal) sent by the optical receiver.

Specifically, the photoelectric signal received by each photo-receiver is converted into an electrical signal representing the intensity of the optical signal in a portion of a wavelength range corresponding to the specific photo-receiver and which can be transmitted to a processing system via an appropriate communication channel.

Preferably, the correspondence between the partitioning in wavelength ranges within the range of interest and the specific index of each photodetector is performed by a spectral calibration procedure using a known peak source directly connected to the spectrophotometer during the system setting-up.

It must be noted that the spectrophotometer may also comprise a single photodetector that is sensitive to the entire band of interest (particularly in the predefined spectral range).

In this case, the average reflectance of the unknown sample may still be detected, although the information is not available in each specific partitioning of the spectral range of interest. Such embodiment proves to be particularly useful for low-cost comparative applications, such as turbidimeters.

Preferably, the spectrophotometer is operatively connected to the optical receiver by means of optical fibres.

In alternative, the optical receiver may be designed to be directly coupled to an optical inlet of the spectrophotometer by directly inputting the captured radiation, i.e., without interposing any electromagnetic radiation transmission means, other than air or other gas, between the optical receiver and the inlet slit of the spectrophotometer.

According to an embodiment of the invention, the optical device includes a casing enclosing the emitting apparatus. The optical guide is removably fixed to the casing.

This allows to associate different optical guides, e.g. in terms of size (particularly in relation to the longitudinal extension of the core inside the optical guide), to the casing containing the emitting apparatus, based on specific conditions and/or requirements of use of the optical device.

Preferably, the guide extends at least partially outside the casing. In particular, the outlet aperture of the optical guide is external to the casing.

In particular, the optical guide is fixed externally to the casing, making it easy to replace the guide itself.

Preferably, the casing encloses, in addition to the emitting apparatus, the optical receiver and/or the spectrophotometer and/or the reference sample.

Preferably, the casing is made of aluminium or stainless steel.

According to an embodiment of the invention, the optical guide comprises a tubular body (cylindrical or not), preferably made of metal. The tubular body comprises the core therein. Preferably, the tubular body is provided therein with the reflective surface that delimits (at least partially) the core.

In particular, the tubular body of the optical guide is made of different types of steel, PTFE, copper, brass or aluminium, depending on the specific requirements arising from the field of application and the type of surface treatment to be performed to obtain the reflective surface.

According to an embodiment of the invention, the optical device comprises a sleeve that contains the optical guide.

Preferably, the sleeve enables the optical guide to be protected from damage and/or external influences which the optical guide may be particularly sensitive to, such as external radiation that may be introduced into the optical guide from sources outside the emitting apparatus of the optical device.

The sleeve is preferably made of stainless steel, wear-resistant steel, aluminium, polymers, PTFE, NYLON, depending on the specific requirements arising from the field of application.

Preferably, the optical guide is removably fixed to the casing by coupling the sleeve to the casing.

In particular, the sleeve is provided with a thread, preferably at one of its longitudinal ends.

The casing of the emitting apparatus comprises a nut for coupling the optical guide to the emitting apparatus device by screwing the sleeve to the casing.

An o-ring seal, arranged between the thread and the nut, may be provided to seal the coupling between the casing of the emitting apparatus and the sleeve of the optical guide.

A further advantage resulting from the removable coupling of the sleeve to the casing is the possibility of replacing the sleeve, e.g. by varying the type of material it is made of, according to specific application requirements without having to replace the casing of the emitting apparatus and/or the optical guide contained therein.

It is thereby possible to put in contact only the sleeve with the unknown sample or product rather than involving also the casing of the emitting apparatus and the optical guide.

According to an embodiment of the invention, the extent of the gap along the direction of the optical axis is equal to, or lower than, 10% of the extension of the core (whose cross-section is comparable in size to that of the first aperture) along the direction perpendicular to the optical axis of the optical guide.

This allows to reduce the conditioning, in terms of angular distribution and intensity, of the radiation coming from the first aperture brought back the core through the inlet aperture.

According to an embodiment of the invention, the longitudinal extent of the optical guide is equal to, or greater than, at least four times the extent of the gap along the direction of the optical axis.

According to an embodiment of the invention, the longitudinal extent of the core is lower than twice its extension along the direction perpendicular to the optical axis of the optical guide, i.e. its diameter in case the core is cylindrical.

This feature prevents the (diffuse) angular energy equal-distribution of the radiation introduced into the optical guide from being significantly affected by multiple reflections of the radiation in the core (since these cannot be ideal reflections).

It must also be noted that an optical guide length, negligible with respect to the core diameter, actually makes the optical guide little useful and possibly detrimental because of edge effects on the guide itself that become dominant over transport reflections within the optical guide.

According to an embodiment of the invention, the longitudinal extent of the optical guide is comprised between 5 mm and 20 mm.

According to an embodiment of the invention, the reflective surface is treated so as to maintain its initial oxidation state over time under operating conditions, i.e. when the optical device is in its first or second first operating condition.

According to an embodiment of the invention, the reflective surface is coated by gold deposition.

An optical system according to the invention comprises the optical device according to one of the embodiments described above.

In particular, the optical system is an optical measurement system, comprising the above-described optical receiver and spectrophotometer.

The optical system also comprises a hollow body comprising a wall provided with an internal surface that delimits (i.e., defines) a containment zone for an unknown sample.

In particular, the hollow body is a container or at least a section of a duct.

The wall of the hollow body is provided with a throughhole configured to receive the optical guide, in particular to receive the sleeve containing the optical guide, such that the outlet aperture of the optical device faces the containment zone to illuminate an unknown sample in the containment zone by means of excitation radiation.

The unknown sample in the containment zone may be in motion or at rest with respect to the optical device during the emission of excitation radiation from it to the containment zone.

In particular, the relative motion of the unknown sample with respect to the optical device occurs along a direction having a main component normal to the optical axis of the optical guide.

An agricultural or industrial machine according to the invention comprises the optical system according to one of the above-described embodiments.

In the context of the present invention, the expression "agricultural machine" identifies a machine suitable for carrying out one or more jobs in the agricultural and/or zootechnical field, while the expression "industrial machine" identifies a machine suitable for carrying out the treatment, conditioning or transport of a product in an industrial plant.

For exemplary purposes, the machine may be a loading chopping machine comprising a duct throwing the chopped product that identifies the containment zone of the optical system. In this case, the longitudinal extension of the optical guide is preferably 10 mm or 11 mm depending on the thickness of the wall of the containment zone.

Alternatively, the machine may be a combine harvester comprising a channel elevating the product being harvested and threshed that identifies the containment zone of the optical system. In this case, the longitudinal extension of the optical guide is preferably 5 mm.

Alternatively, the machine may be a hay baling machine comprising an open compression chamber that identifies the containment zone of the optical system. In this case, the longitudinal extension of the optical guide is typically 12 mm.

Alternatively, the machine may be a machine that is part of an industrial hay drying plant, provided with a product conveying duct that identifies the containment zone of the optical measuring system.

For exemplary purposes, the machine may also be identified as a mill, dryer or pelletizer.

Alternatively, the machine may be a mixer wagon comprising a mixing tank that identifies the containment zone of the optical system. In this case, the longitudinal extension of the optical guide is preferably 9 mm but may vary depending on the specific model of the mixer wagon.

BRIEF DESCRIPTION OF THE DRAWINGS

Features and further advantages of the invention will be more apparent from the following detailed description of preferred, though non-exclusive embodiments thereof, which are illustrated, for exemplary and non-limiting purposes, with reference to the accompanying drawings wherein.

DESCRIPTION OF EMBODIMENTS OF THE INVENTION

Figure 1:
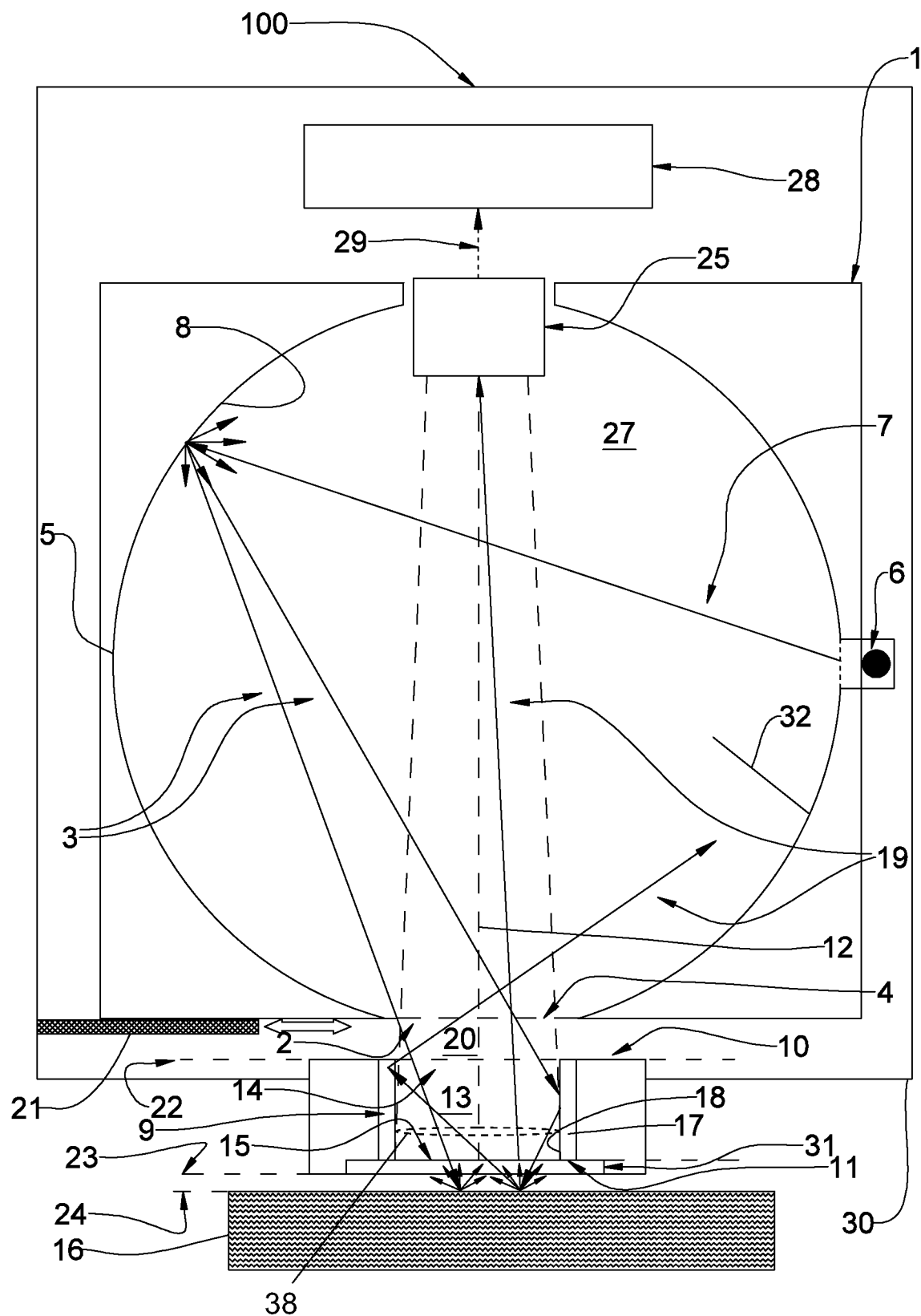
FIG. 1 is a schematic section view of an optical device according to an embodiment of the invention and in a first operating condition, provided with an additional optical component for the correction of the framed field, installed inside the optical guide

Referring initially to FIG. 1, an optical device according to an embodiment of the invention is globally indicated by number 100.

The optical device 100 comprises an emitting apparatus 1 provided with a first aperture 2 and suitable for emitting an excitation radiation 3 through the first aperture 2.

Excitation radiation 3 comprises light radiation having wavelengths included in a predefined spectral range (900 nm-1700 nm).

The first aperture 2 defines a first plane surface 4 of the emitting apparatus 1.

In particular, the emitting apparatus 1 comprises an integrating sphere 5 that is internally hollow and provided with the first aperture 2. The cavity 27 is delimited by a spherical internal surface 8.

The emitting apparatus 1 also comprises a light source 6 suitable for projecting a first radiation 7 onto the internal surface 8 of the integrating sphere 5. The inner surface 8 of the integrating sphere 5 is suitable for reflecting the first light radiation 7 thus giving rise to the excitation radiation 3.

Referring to the figures, the optical device 100 comprises an optical barrier 32 that is opaque to the first light radiation 7. The optical barrier 32 is arranged in the cavity 27 of the emitting apparatus 1 between said light source 6 and the first aperture 2 so as to intercept the first light radiation 7, preventing it from directly reaching the first aperture 2.

The optical device 100 also comprises an optical guide 9 longitudinally extended between a first end thereof 10 and a second end thereof 11. The longitudinal extension of the optical guide 9 defines the optical axis 12 of the optical guide.

The optical guide 9 is internally provided with a core 13 defining an inlet aperture 14 at the first end 10 and an outlet aperture 15 at the second end 11.

The core 13 shown in the figures is a cavity. Optionally, the inlet aperture and/or the outlet aperture are closed by a corresponding optical window 31 that is transparent to the light radiation 3 emitted by the emitting apparatus 1.

The cavity 13, if sealed on both ends 10 and 11 by transparent, sealed optical windows, may comprise at least one gas, more preferably a mixture of gases, such as: argon or nitrogen or air.

In case only the transparent optical window is present to close the inlet aperture 15, the cavity 13 will naturally include air.

Referring to FIG. 1, the inlet aperture 14 is arranged at the first aperture 2 such that the excitation radiation 3 emitted by the emitting apparatus 1 passes through it while the outlet aperture 15 is intended to face an unknown sample 16 when the optical device 100 is in an initial operating condition.

The optical guide 9 comprises a tubular body 17 extended longitudinally between the first end 10 and the second end 11. The tubular body 17 is internally provided with a reflective surface 18 delimiting the core 13.

In particular, the optical guide 9 is made functional thanks to the reflective surface 18, obtained by an appropriate treatment of the tubular body 17.

Figure 2:
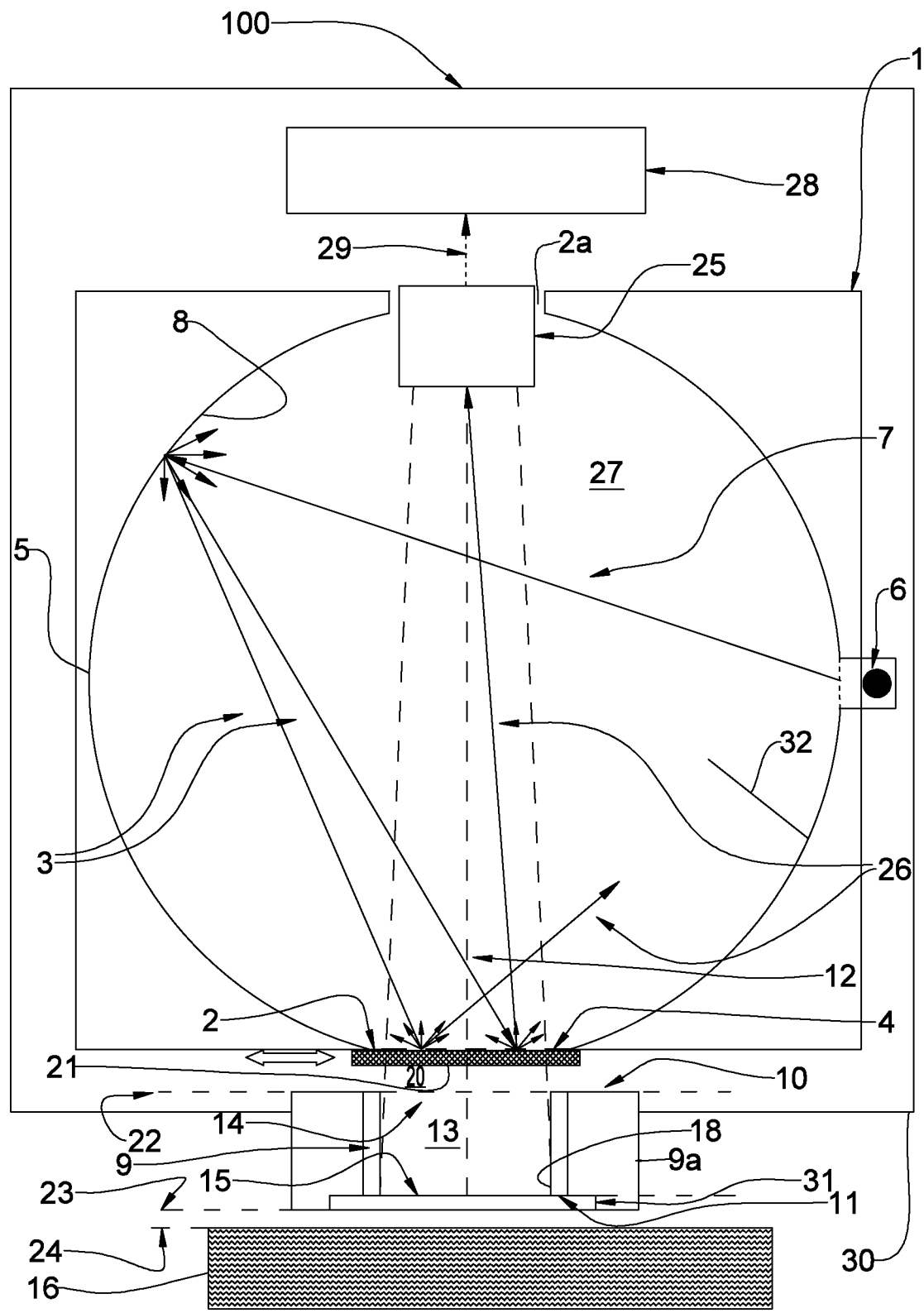
FIG. 2 shows the optical device of FIG. 1 without an additional optical component, seen in section, in a second operating condition.

The optical guide 9 may be supported by a sleeve where it is contained and which allows it to be handled. The sleeve is indicated in FIG. 2 by reference number 9a.

The core 13 of the optical guide 9 has thus a constant circular cross-section along the longitudinal extent of the optical guide 9, and both the inlet aperture 14 and the outlet aperture 15 have a circular shape. The core 13 also allows the direct passage of rays of light radiation 3 that do not hit the reflective surface 18 and may therefore enter and exit directly from the inlet aperture 14 and the outlet aperture 15, respectively.

The reflective surface 18, made for example of 24$kt$ gold, is suitable for reflecting the light radiation 3 projected into the cavity 13 through the inlet aperture 14 such as to propagate the light radiation 3 out of the optical guide 9 through the outlet aperture 15.

The reflective surface 18 is a regular optical surface with respect to radiation with a wavelength included in the above predefined spectral range.

With reference to FIG. 1, the optical device 100 comprises a gap 20 arranged between the first aperture 2 and the inlet aperture 14, the gap 20 being suitable for receiving a reference sample 21 such that the light radiation 3 emitted by the emitting apparatus 1 through the first aperture 2 is intercepted and reflected by the reference sample 21 when the optical device 100 is in a second operating condition, wherein the reference sample 21 is received in the gap 20.

FIG. 1 also shows an optical component 38 arranged within the optical guide 9. The optical component 38 is extended into the core 13 and is apt to change the angle of view framed through the outlet aperture 15 of the optical device 100. The optical component 38 may be with a positive equivalent focal length to reduce the angle of view framed by the outlet aperture 15, or with a negative equivalent focal length to enlarge the aforesaid field angle.

FIG. 2 shows the reference sample 21 received in the gap 20.

Referring to FIGS. 1 and 2, the inlet aperture 14 and the outlet aperture 15 define a plane inlet surface 22 and, respectively, a plane outlet surface 23 of the optical guide 9, such surfaces 22 and 23 and the first plane surface 4 of the emitting apparatus 1 being parallel to each other. The outlet plane surface 23 is also parallel to a measurement plane surface 24 that best approximates the surface of the unknown sample 16 when the optical device 100 is in the first operating condition.

The optical device 100 comprises an optical receiver 25 that is external to the optical guide and arranged to receive and collect at least a portion of a first light signal 19 or of a second light signal 26 passing through the first aperture 2, wherein the first light signal 19 corresponds to at least a portion of the excitation radiation 3 emitted by the outlet aperture 15 and reflected by the unknown sample 16 when the optical device 100 is in the first operating condition and the second light signal 26 corresponds to at least a portion of the light radiation 3 reflected by the reference sample 21 when it is received in the gap 20.

The optical receiver 25 is at least partially contained within the empty space (cavity) 27 delimited by the internal surface 8 of the integrating sphere 5 so as to receive part of the first light signal 19 or the second light signal 26 projected into the cavity 27 of the emitting apparatus 1 through the first aperture 2.

The optical receiver 25 shown in the figures is arranged as opposite to the first aperture 2 with respect to the centre of the cavity 27 of the emitting apparatus 1. Specifically, the optical receiver 25 is arranged at a second aperture 2a of the emitting apparatus 1, along the normal to the first plane surface 4 of the emitting apparatus 1.

The optical device 100 also comprises a NIR spectrophotometer 28 operatively connected to the optical receiver 25 to receive and analyse a light radiation 29 sent from the optical receiver 25 based on the first light signal 19 or the second light signal 26 received. Specifically, the light radiation 29 corresponds to the rays of the first light signal 19 or the second light signal 26 detected by the optical receiver 25.

The NIR spectrophotometer 28 is operatively connected to the optical receiver 25 by optical fibres, or the optical receiver is designed to input light radiation 29 directly into the spectrophotometer, i.e., without interposing any electromagnetic radiation transmission means.

In addition, the optical device 100 is provided with a casing 30 that contains the emitting apparatus 1. The optical guide 9 is removably fixed to the casing 30 by its own sleeve 9a.

The casing 30 encloses the spectrophotometer 28, the optical receiver 25, the emitting apparatus 1, and the reference sample 21.

Figure 3:
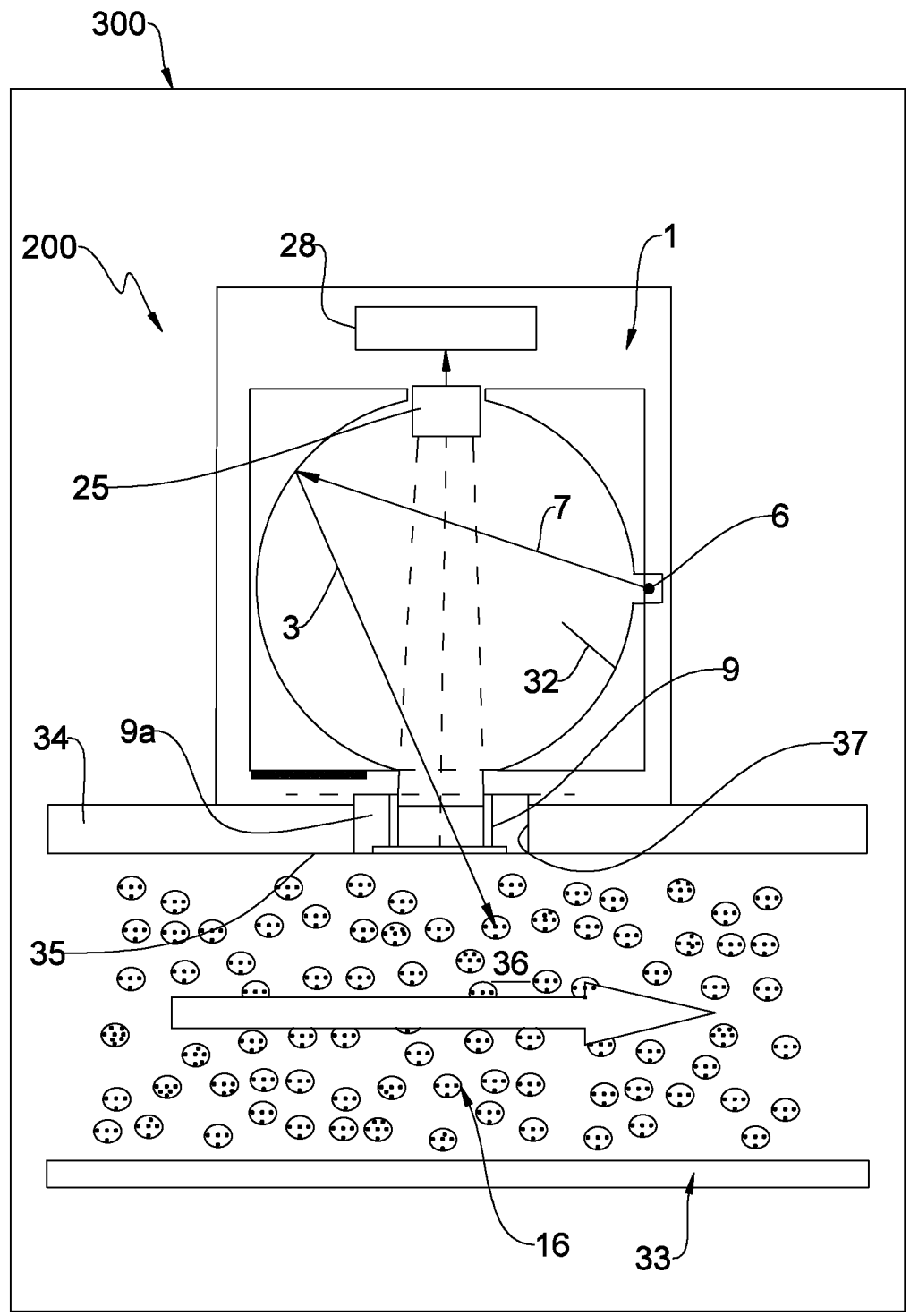
FIG. 3 is a schematic section view of an optical system and machine according to an embodiment of the invention.

FIG. 3 schematically shows an optical system and machine according to one embodiment of the invention. The optical system, globally indicated by number 200, comprises the optical device 100 and a hollow body (duct) 33 comprising a wall 34 provided with an internal surface 35 that delimits a containment zone 36 of an unknown sample 16.

The wall 34 of the duct 33 is provided with a through-hole 37 configured to receive the sleeve 9a containing the optical guide 9 such that the outlet aperture 15 of the optical device 100 faces the containment zone 36 to illuminate the unknown sample 16 by an excitation radiation 3.

A machine comprising the optical system 200 is indicated by number 300.

The invention thus solves the proposed problem while achieving multiple benefits.

In particular, the invention allows the unknown sample to be illuminated in a way that is equivalent, or in any case very similar, to the reference sample placed near the first aperture 2, even when the unknown sample is (conspicuously) spaced apart from the first aperture 2. In particular, the average statistical distribution of the illuminating radiation, as a function of the spatial location in terms of intensity, spectral content and angular distribution, are kept similar.

The invention also allows to accurately measure the relative reflectance of the unknown sample spaced apart (with respect to the reference sample inside the optical device) and consequently also the absolute value thereof.

The invention claimed is:

1. An optical device comprising:
an emitting apparatus comprising a first aperture and which is configured to emit an excitation radiation through said first aperture, said excitation radiation comprising at least one light radiation having a wavelength included in a predefined spectral range,
an optical guide which extends longitudinally between a first end thereof and a second end thereof and which is internally provided with a core which is configured to propagate radiation at a wavelength included in said predefined spectral range and defining an inlet aperture at said first end and an outlet aperture at said second end, said inlet aperture facing said first aperture so as to be passed through by at least a portion of said excitation radiation when said excitation radiation is emitted by said emitting apparatus, and said outlet aperture being configured to be directed towards an unknown sample when said optical device is in a first operating condition,
wherein said optical guide comprises a reflective surface which at least partially delimits said core, said reflective surface being a regular optical surface with respect to radiation with a wavelength included in said predefined spectral range and configured to reflect the portion of the excitation radiation which is projected into said core through the inlet aperture so as to propagate said excitation radiation out of said optical guide through said outlet aperture in order to illuminate the unknown sample, wherein said optical device comprises a gap which is arranged between said first aperture and said inlet aperture, said gap being configured to receive a reference sample so that the excitation radiation emitted by said emitting apparatus through said first aperture illuminates the reference sample when said optical device is in a second operating condition, in which said reference sample is received in said gap.

2. The optical device according to claim 1, wherein said core is configured to propagate a first light signal which is introduced into said core through said outlet aperture so as to transmit said first light signal towards said first aperture through said inlet aperture, said first light signal corresponding to at least a portion of the excitation radiation which is emitted by said outlet aperture and which is reflected by said unknown sample when said optical device is in said first operating condition.

3. The optical device according to claim 2, further comprising an optical receiver which is arranged to receive and collect at least a portion of said first light signal or a second light signal which passes through said first aperture, said second light signal corresponding to at least a portion of the excitation radiation which is reflected by said reference sample when the optical device is in said second operating condition.

4. The optical device according to claim 3, further comprising a spectrophotometer which is operatively connected to said optical receiver in order to receive a light radiation which is transmitted by said optical receiver on the basis of said first light signal or said second light signal received.

5. The optical device according to claim 1, wherein said predefined spectral range is defined between 200 nm and 2500 nm.

6. The optical device according to claim 1, wherein said emitting apparatus is a diffuse light source.

7. The optical device according claim 1, wherein said emitting apparatus comprises:
a cavity which is delimited by an internal surface,
at least one light source which is configured to project a first light radiation on said internal surface,
wherein said internal surface is configured to reflect the first light radiation, thereby giving rise to said excitation radiation.

8. The optical device according to claim 7, wherein said internal surface is at least partially spherical in such a manner that said excitation radiation is of the type substantially diffused at said first aperture.

9. The optical device according to claim 7, further comprising an optical barrier which is opaque to the first light radiation, said optical barrier being arranged in the cavity of said emitting apparatus between said light source and said first aperture so as to intercept the first light radiation, preventing the first light radiation from directly reaching said first aperture.

10. The optical device according to claim 1, wherein said core of said optical guide has a circular cross-section which is constant over the entire longitudinal extent of said optical guide.

11. The optical device according to claim 1, wherein said core is a cavity which comprises at least one non-diffuse substance in the gaseous state which is substantially transparent to radiation with a wavelength included in said predefined spectral range, or said core is a solid body which is constructed from non-diffusive material which is substantially transparent to radiation with a wavelength which is included in said predefined spectral range.

12. The optical device according to claim 1, further comprising a casing enclosing said emitting apparatus.

13. The optical device according to claim 12, wherein said optical guide is fixed in a removable manner to said casing.

14. The optical device according to claim 13, wherein said optical guide is fixed in a removable manner to said casing by means of a sleeve which contains said optical guide.

15. The optical device according to claim 12, wherein said optical guide extends at least partially outside said casing.

16. The optical device according to claim 15, wherein said outlet aperture of said optical guide is external to said casing.

17. The optical device according to claim 1, wherein said optical guide extends longitudinally along a direction defining the optical axis of said optical guide, and wherein the extension of said gap along the direction of said optical axis is equal to, or lower than, 10% of the extension of said core along a direction perpendicular to said optical axis.

18. The optical device according to claim 1, wherein said optical guide extends longitudinally along a direction which defines the optical axis of said optical guide, and wherein the longitudinal extent of said optical guide is equal to, or greater than, at least four times the extension of said gap along the direction of said optical axis.

19. The optical device according to claim 1, wherein said optical device comprises an optical component arranged within said optical guide, wherein said optical component, which consists of a single lens or comprises a lens assembly, extends into said core and is configured to change an angle of view framed through said outlet aperture.

20. An optical system comprising an optical device according to claim 1, and a hollow body comprising a wall which is provided with an internal surface which delimits a containment zone for an unknown sample, said wall being provided with a through-hole which is configured to receive said optical guide of said optical device in such a manner that the outlet aperture of said optical device is directed towards said containment zone in order to illuminate an unknown sample in said containment zone by means of an excitation radiation.

21. An agricultural machine or an industrial machine comprising an optical system according to claim 20.

* * * * *